(12) United States Patent
Skene et al.

(10) Patent No.: US 6,726,948 B2
(45) Date of Patent: Apr. 27, 2004

(54) METHOD AND SYSTEM FOR MOVING A FLOWABLE SUBSTRATE THROUGH A HEATED CHAMBER

(75) Inventors: Gary Skene, Meadowvale (CA); John M. Martin, Blairstown, NJ (US); Dennis Delaney, Dublin, OH (US); Roberto A. Capodieci, Glen Ellyn, IL (US)

(73) Assignee: Mars Incorporated, McLean, VA (US)

( * ) Notice: Subject to any disclaimer, the term of this patent is extended or adjusted under 35 U.S.C. 154(b) by 30 days.

(21) Appl. No.: 10/137,581

(22) Filed: May 2, 2002

(65) Prior Publication Data

US 2003/0207013 A1 Nov. 6, 2003

(51) Int. Cl.⁷ ............................ A22C 11/00; A23P 1/00
(52) U.S. Cl. ........................ 426/513; 99/441; 99/451; 426/238; 426/523
(58) Field of Search ................................ 426/512, 513, 426/516, 520, 523, 238; 99/426, 441, 451

(56) References Cited

U.S. PATENT DOCUMENTS 5,132,137 A    7/1992   Reimann et al.
5,236,731 A *  8/1993   Becker ........................ 426/513

* cited by examiner

Primary Examiner—George C. Yeung
(74) Attorney, Agent, or Firm—Fulbright & Jaworski L.L.P.

(57) ABSTRACT

A system and method for moving a flowable substrate through a chamber is provided. The chamber extends between first and second open ends and is both shaped and heated such that the flowable substrate can be shaped and cooked therein. A pushing force is applied to the cooked substrate to expel the cooked substrate through the second open end. In one embodiment, the pushing force is provided by a pushing device that extends into the chamber at the first open end to loosen the cooked substrate from the chamber walls and to cause the cooked substrate to exit the chamber through the second open end. In another embodiment, the pushing force is provided by a fill device that continuously introduces the flowable substrate into the chamber. In certain embodiments, an ultrasonic energy source may be provided to prevent adherence of the food product to the chamber walls and/or to assist in loosening any adhered food product from the chamber walls.

26 Claims, 1 Drawing Sheet

METHOD AND SYSTEM FOR MOVING A FLOWABLE SUBSTRATE THROUGH A HEATED CHAMBER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The food industry typically is geared for the mass production of various different types of food products intended for consumption by animals, including humans. A mass production assembly line often requires physically large pieces of equipment to handle the volume. Typically, the manufacturing process involves many steps, all of which must be performed at different stations. For example, a typical process for producing a food product (e.g., animal food) may include mixing the ingredients, emulsifying the mixture, shaping or extruding the emulsion into "ropes," cooking the ropes in a steam tunnel, cutting the cooked product, and storing the cooked product in accumulators until needed for later processing. The process further may include mixing the cooked product with other ingredients (e.g., a gravy), dispensing the mixed product into pouches, sealing the pouches, sterilizing the pouches, and commercial packaging of the final product. It can be seen from this example that numerous stations and large pieces of equipment are needed, all of which may require a large manufacturing facility. Thus, a mass production assembly line often is capital intensive.

To attain the most efficient use of production equipment, a particular assembly line often may be used to manufacture different variations of a food product. For example, the same assembly line might be used to produce a food product made of either chicken or beef. To prevent contamination, the assembly line must be broken down and thoroughly cleaned and sterilized after producing the first variety before the line can be used to produce the second variety of the food product. Stopping and cleaning the assembly line is costly, both in terms of labor and time.

Such cost concerns dictate that large runs of a particular variety of a food product should be completed before stopping and preparing the assembly line for another variety of the food product. However, large runs of a food product mean that mass quantities of the product must be stored until needed. Oftentimes, spoilage and waste may result from inventorying the food product, thus further affecting the cost associated with a mass production facility.

For some food products, it may be desirable to produce relatively small batches at a given time to minimize spoilage and waste. However, it may be cost-prohibitive to use a mass production assembly line to manufacture low volumes of the product due to the expenses associated with stopping and preparing the line for production of a new product. Thus, it would be desirable to provide an assembly line that was cost effective for small batch production of a particular food product or variety of a food product. Using smaller equipment and reducing the number of stations through which the food product must pass could realize such cost effectiveness. For example, it would be advantageous to provide a station at which multiple processing steps could occur. In the case of an extruded or shaped food product, it would be desirable if the food product easily could be shaped and cooked in the same fixture.

In a conventional shaping fixture, an edible emulsion is fed or pumped into a nozzle block having a plurality ports. The continuous feeding of the emulsion into the nozzle block forces the emulsion through the block and out the ports, thus shaping the emulsion into ropes that are fed onto a large belt in the assembly line. The belt conveys the resulting ropes through a long steam tunnel in which they are cooked until reaching a temperature greater than 85 C. It would be desirable if the shaping and cooking of the emulsion could occur in a single fixture, thus eliminating the need for a lengthy conveyor belt and steam tunnel.

Although cooking could occur in the shaping fixture by application of thermal energy, it is likely that the cooking process will result in the cooked product adhering to the interior surface the shaping fixture due to the close accommodations therein. If sticking occurs, it may be difficult to remove the cooked product from the shaping fixture solely via the pushing force created by feeding additional emulsion into the fixture. Opening the fixture and knocking out the cooked product is cumbersome and thus is not a viable alternative.

Accordingly, it would be desirable to provide a method and system of moving an emulsion through a shaping and cooking fixture without having to disassemble the fixture to remove the cooked product.

BRIEF SUMMARY OF THE INVENTION

The present invention is directed to a system and method which moves a flowable substrate through a chamber in which the substrate is both heated and shaped. Thus, in accordance with a first aspect of the invention, a food manufacturing process comprises introducing a flowable substrate into a shaping structure having an elongate shaping chamber extending between first and second open ends. The flowable substrate is heated in the chamber to produce a cooked, shaped product. A pushing force is applied to the cooked product which is directed toward the second open end. The pushing force expels the cooked product from the chamber through the second open end. In one embodiment, the pushing force is provided by a pushing device insertable at the first open end. Vibrational energy also may be applied to the chamber to facilitate expelling the cooked product therefrom.

In accordance with another aspect of the invention, a system for manufacturing a product comprises a structure having at least one elongate chamber extending between first and second open ends. The structure also includes an inlet in communication with the elongate chamber to introduce a flowable substrate into the chamber. An energy source in communication with the structure is configured to heat the chamber to cook the flowable substrate therein. In one embodiment, a pushing device in communication with the first open end of the chamber is configured to apply a pushing force to the cooked substrate to cause it to exit the chamber through the second open end. In another embodiment, vibrational energy is applied to the structure to facilitate exit of the cooked substrate from the chamber through the second open end.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The present invention provides a system and method for moving a flowable substrate through a fixture that both shapes and cooks the flowable substrate. The invention is particularly useful for small batch processing of animal food products since the amount of equipment needed for the manufacturing process is cut down by combining functions (i.e., cooking and shaping) within a single fixture. It should be understood, however, that the invention can be applied to any manufacturing process for shaping and heating/cooking a flowable substrate, regardless of whether intended for consumption by animals.

A typical batch manufacturing process involves the performance of many steps. These steps generally start with the preparation of a batch of an edible, flowable substrate, such as a protein-based substrate. The various ingredients for the flowable substrate, such as meat, fat, flavoring, starch, fibers, and vitamins, etc., may be dispensed into a large mixer. In a typical process, a batch typically weighing between 750 to 1,500 kilograms is mixed for 1 to 10 minutes to evenly distribute the ingredients. The mixture then may be run through an emulsifier to reduce particle size to, for example, less than 1.5 mm and to coat the fat particles in the mixture with protein. Temperature during the emulsification step generally is maintained at less than 25° C.

The resulting emulsion then may be placed in a hopper and fed through a nozzle block which shapes the emulsion into "ropes" that are fed out onto a large conveyor belt. The conveyor belt passes through a long steam tunnel in which the ropes are cooked until they reach approximately 85° C. A rotary-type cutter then may cut the ropes into small pieces or chunks. The conveyor belt then transports the shaped, cooked, and cut chunks to storage where they are held in accumulators until needed for a later process.

For example, in an animal food production facility, the chunks may be retrieved from the accumulators and transported to a filling station where the chunks are dispensed into pouches together with gravy. After the filled pouches are sealed, they are loaded into sterilization trays and placed in a retort for sterilization. The sterilized pouches then are removed from the trays and packaged for sale.

Figure 1:
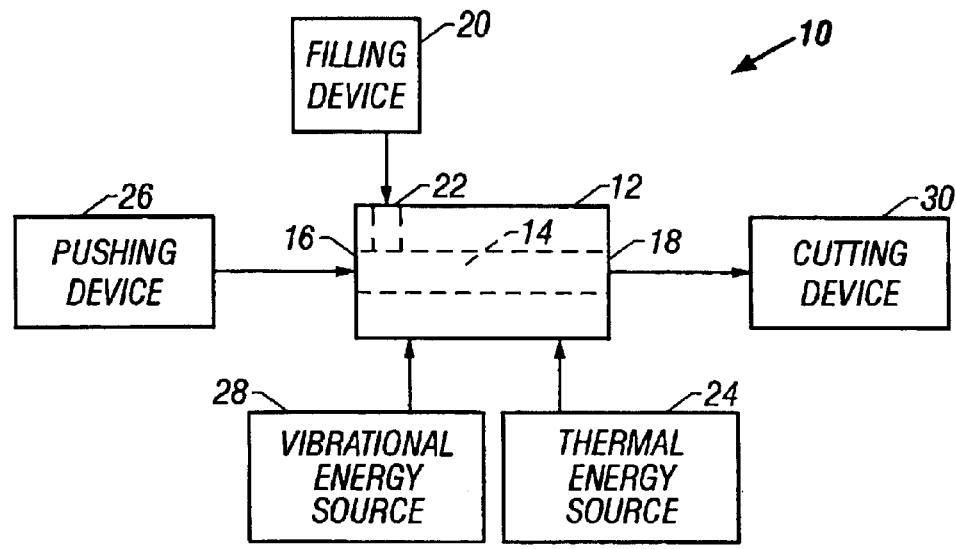
FIG. 1 is a block diagram representing a system in which a flowable substrate is fed into, shaped and cooked, and then removed from a heated chamber.

Turning now to the drawings, and in particular to FIG. 1, a block diagram of a manufacturing system 10 in accordance with the invention is illustrated. As shown in FIG. 1, the system 10 includes a fixture 12 having at least one shaped chamber 14 that extends between a first open end 16 and a second open end 18. The fixture 12 may be made of any of a variety of conventional materials, such as stainless steel, titanium, etc. The chamber 14 may have any of a variety of shapes, such as tubular with a circular cross section or tubular with a cross section resembling a star, a dog bone, a crescent, etc. If desired, the walls of the chamber 14 may be coated with a non-stick coating to facilitate movement of the substrate through the chamber.

The system 10 also includes a filling device 20 in communication with the fixture 12 to introduce a flowable substrate, such as the emulsion described above, into the chamber 14. For example, the filling device 20 may be a hopper in communication with an inlet 22 of the fixture 12. Each chamber 14 in the fixture 12 may be filled via a respective inlet 22. Alternatively, the inlet 22 may communicate with a common chamber in the fixture 12, which has openings into the one or more shaped chambers 14. In any event, sufficient substrate is introduced into the chamber 14 such that the chamber 14 can impart a shape to the substrate when cooked.

In one embodiment of the invention, the filling device 20 may be configured to introduce the flowable substrate into the chamber 14 in a non-continuous manner. For example, the filling device 20 may be in communication with a metering device such that a sufficient amount of substrate passes into the fixture 12 to adequately fill the one or more chambers 14, while leaving adequate room for any expansion that may occur as a result of heating. When the one or more chambers 14 are fill, the filling device 20 ceases introducing the substrate into the fixture, thus giving the substrate sufficient time to cook before removal from the chamber 14. After the cooked product is removed, the filling device 20 again introduces more flowable substrate into the fixture 12.

For purposes of this disclosure, "cooking" refers to changing the physical and/or chemical state of the substrate. For example, it may be desired to "cook" the substrate such that the ingredients no longer are in a raw state. Alternatively, it may be desired to cook the substrate such that the exterior surface of the substrate is hardened. Still further, it may be desired to cook the substrate such that it is sufficiently stiffened and can retain its shape after exiting the shaping chamber. In some embodiments, a combination of state changes may be desired. For example, it may be desired to cook the substrate such that the ingredients are no longer in a raw state and the exterior surface of the substrate is transformed into a hard shell.

A thermal energy source 24 is in communication with the fixture 12. The thermal energy source 24 may be any conventional heating unit that is configured to heat the one or more chambers 14 to an appropriate temperature to adequately cook the substrate therein (e.g., electrical, hot oil, hot water, hot gravy, steam, etc.). For example, in one embodiment, the heat source 24 is capable of heating the chamber 14 such that the temperature of the substrate reaches at least 85° C. The amount of heat necessary and the length of time needed to cook the substrate will depend on the type of substrate, the dimensions of the chamber, the configuration of the fixture 12, the type of thermal energy source 24, the desired cooking result (i.e., physical and/or chemical state changes), etc., as would be readily understood by one of ordinary skill in the art.

After the substrate has attained the desired cooking result, it is removed from the fixture 12 through the second open end 18. In many food-processing methods, the substrate can be removed from a shaping chamber by the pushing force created by additional substrate being fed into the chamber. However, when the substrate is cooked in the shaping chamber 14, expansion occurs and the cooking process may cause portions of the outer surface of the substrate to adhere to the interior surfaces of the walls which define the chamber 14. The pushing force created by the filling device 20 generally may be inadequate to break the bond between the expanded, cooked substrate and the surfaces of the chamber walls such that the substrate may be moved out of the chamber 14.

Thus, in the system 10 illustrated in FIG. 1, a pushing assembly 26 is provided which is in communication with the first open end of the chamber 14. The pushing assembly 26 may include one or more piston or plunger-like members, each of which is insertable within a respective chamber 14. In one embodiment, the pushing assembly 26 may include a drive unit that controls the movement of the piston/plunger members. The drive unit, in turn, may be in communication with a monitoring device that provides control signals to cause the drive unit to appropriately activate or deactivate the piston/plunger members. For example, the monitoring device may monitor filling of the chamber 14 and/or the heating of the substrate within the chamber 14. When the substrate has reached an adequate temperature or after a sufficient time has passed to ensure that the substrate is properly cooked, then the monitoring device may generate a control signal that activates the pushing device 26 such that the pistons/plungers are inserted into the one or more chambers 14.

The pushing device 26 is configured to generate a pushing force directed from the first open end 16 toward the second open end 18. In one embodiment, the pushing force is sufficient to separate the cooked substrate from the chamber walls and to expel the cooked substrate from the chamber 14. Once removal of the cooked substrate is ensured, then the pushing device 26 may retract the piston/plunger members such that additional substrate may be introduced into the recently vacated chamber 14.

In an alternative embodiment, a mechanical vibrational energy source 28 also is in communication with the fixture 12. The vibrational energy source 28 may be configured to generate sufficient vibrational energy to at least partially loosen or separate the outer surface of the cooked substrate from the surfaces of the chamber walls. If the bond is broken in this manner, then the force generated by the pushing device 26 upon the cooked substrate can be reduced. This feature may be desirable if the separation force that otherwise would have to be generated by the pushing device 26 may damage the shape of the cooked substrate. In one embodiment, the mechanical vibrational energy source 28 may be a conventional ultrasonic energy source.

Alternatively, the pushing device 26 may be omitted if the vibrational energy source 28 is configured to vibrate the walls of the one or more shaping chambers 14 sufficiently to prevent the flowable substrate from adhering to the wall surfaces and/or to loosen any adhered portions of the flowable substrate. In this embodiment, the pushing force that expels the cooked, shaped product from the outlet 18 comes from the flowable substrate entering the chamber 14 in either a continuous or discontinuous manner. Such an embodiment offers the additional advantage of enabling a continuous filling, shaping, and cooking process, because filling of the chamber need not be halted to allow for insertion of the pushing device 26. Further, in this embodiment, the flowable substrate may enter the one or more shaping chambers 14 either via the inlet 22 or via a feed tube in communication with the first open end 16.

In yet another embodiment, the flowable substrate can be fed into the chamber 14 in a continuous manner for a period of time and then paused to allow for insertion of the pushing device 26. Such a configuration is useful if the pushing force from the entering substrate is sufficient to move the substrate through the chamber, but a certain amount of residue remains adhered to the surface of the chamber wall. Periodic insertion of the pushing device 26 can thus clean the chamber wall surfaces to prevent burning and/or buildup of the residual material.

Either while or after the cooked substrate has exited the chamber 14 through the second open end 18, a cutting device 30 may cut the cooked, shaped substrate into smaller pieces or chunks. For example, the cutting device 30 may include a rotating cutting blade that slices the cooked substrate as it exits the chamber 14. The cut pieces then may be conveyed to the next station in the assembly line or placed in an accumulator for later use.

Figure 2:
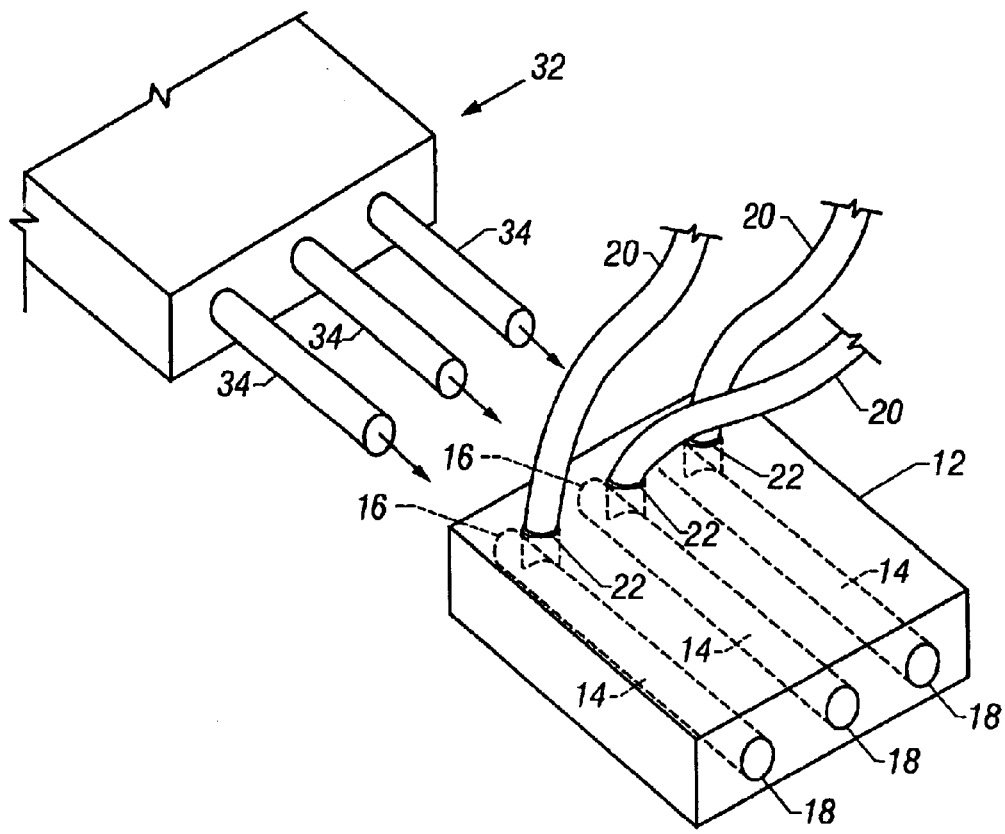
FIG. 2 illustrates an embodiment of an exemplary shaping and cook structure with a heated chamber and an exemplary pushing device for removing the cooked, shaped product from the heated chamber.

Turning now to FIG. 2, it illustrates an exemplary embodiment of a fixture 12 with a plurality of shaped chambers 14 extending between respective first and second open ends 16 and 18. A plurality of inlets 22 communicate with a respective chamber 14. A plunger device 32 which is part of an exemplary pushing device 26 also is illustrated. The plunger device 32 includes a plurality of plungers 34, each of which is insertable into a respective chamber 14 through its first open end 16. The plungers 34 may be configured such that they can be extended through the entire length of each chamber 14 such that the cooked substrate can be completely expelled through the second open end 18. Alternatively, the length of the plungers 34 may be less than the length of each chamber 14 such that the cooked product is expelled from the chambers 14 via a combination of a pushing force exerted by the plungers 34 and a pushing force exerted by additional flowable substrate entering the chambers 14.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A process for manufacturing a cooked, shaped product, comprising:
   introducing a flowable substrate into an elongate shaping chamber extending between first and second open ends of a shaping fixture;
   heating the flowable substrate in the elongate shaping chamber to produce a cooked, shaped product; and
   using a pushing force directed through the first open end to expel the cooked, shaped product through the second open end.

2. The manufacturing process as recited in claim 1, wherein the elongate shaping chamber is defined by an inner surface of a wall, and the process comprises: vibrating the inner surface of the wall to facilitate expelling the cooked, shaped product through the second open end.

3. The manufacturing process as recited in claim 2, wherein the inner surface of the wall is vibrated by an ultrasonic energy source.

4. The manufacturing process as recited in claim 1, comprising cutting the cooked, shaped product as it is expelled through the second open end.

5. The manufacturing process as recited in claim 1, wherein the flowable substrate is an animal-consumable substrate.

6. A system for manufacturing a cooked product, comprising:
   a fixture having at least one elongate chamber extending between first and second open ends, the fixture having an inlet in communication with the elongate chamber to introduce a flowable substrate therein;
   an energy source in communication with the fixture and configured to heat the chamber to cook the flowable substrate therein; and
   a pushing device in communication with the first open end of the chamber, the pushing device configured to apply a pushing force to the flowable substrate after the flowable substrate is cooked to push the cooked flowable substrate through the second open end.

7. The system as recited in claim 6, comprising:
   a cutting device configured to cut the cooked flowable substrate into a plurality of chunks.

8. The system as recited in claim 6, wherein the fixture comprises a plurality of elongate chambers extending between respective first and second open ends.

9. The system as recited in claim 8, wherein each of the plurality of elongate chambers is in communication with a respective inlet for introducing the flowable substrate.

10. The system as recited in claim 6, wherein the at least one elongate chamber is defined by an inner surface of a wall, and the system comprises a vibrational source in communication with the fixture to vibrate the inner surface of the wall.

11. The system as recited in claim 6, wherein the pushing device comprises a pushing member insertable into the elongate chamber at the first open end, and wherein the pushing device is configured to withdraw the pushing member from the chamber after applying the pushing force to the flowable substrate.

12. The system as recited in claim 6, wherein the elongate chamber has a tubular shape.

13. The system as recited in claim 12, wherein the elongate chamber has a circular cross section.

14. The system as recited in claim 10, wherein the vibrational energy source comprises an ultrasonic energy source.

15. The system as recited in claim 6, wherein the flowable substrate comprises an animal food product.

16. A method of manufacturing a cooked product, the method comprising:
    feeding a flowable substrate into a shaping tool, the shaping tool comprising a tubular chamber extending between first and second open ends, the tubular chamber being defined by an inner surface of a wall;
    heating the flowable substrate in the tubular chamber to produce a cooked product;
    vibrating the inner surface of the wall; and
    pushing the cooked product through the second open end.

17. The method as recited in claim 16, wherein pushing the cooked product comprises inserting a pushing device through the first open end of the tubular chamber.

18. The method as recited in claim 17, comprising:
    discontinuing feeding the flowable substrate into the shaping tool when the tubular chamber is full.

19. The method as recited in claim 18, comprising; withdrawing the pushing device from the shaping chamber; and then feeding a flowable food substrate into the tubular chamber.

20. The method as recited in claim 16, wherein vibrating the inner surface of the wall comprises applying ultrasonic energy to the shaping tool.

21. The method as recited in claim 16, wherein pushing the cooked product comprises continuously feeding the flowable substrate into the shaping tool.

22. A system for manufacturing a cooked, flowable substrate, comprising:
    a fixture having at least one elongate chamber extending between first and second open ends, the fixture having an inlet in communication with the elongate chamber to introduce a flowable substrate therein, the at least one elongate chamber being defined by an inner surface of a wall;
    a first energy source in communication with the fixture and configured to cook the flowable substrate while in the elongate chamber;
    a second energy source in communication with the fixture and configured to vibrate the inner surface of the wall; and
    a third energy source in communication with the fixture and configured to provide a pushing force on the cooked, flowable substrate to expel the cooked, flowable substrate through the second open end.

23. The manufacturing system as recited in claim 22, wherein the second energy source is an ultrasonic energy source.

24. The manufacturing system as recited in claim 22, wherein the third energy source comprises a fill device in communication with the inlet, the fill device configured to continuously introduce the flowable substrate into the elongate chamber, such that the continuous introduction of the flowable substrate provides the pushing force to expel the cooked, flowable substrate through the second open end.

25. The manufacturing system as recited in claim 22, wherein the third energy source comprises a pushing device in communication with the first open end, the pushing device configured to apply the pushing force to expel the cooked flowable substrate through the second open end.

26. The manufacturing process of claim 1, further comprising the step of inserting a pushing device through the first open end and through the length of the chamber to clean the chamber wall surfaces.

* * * * *